United States Patent
Dowle et al.

(10) Patent No.: US 9,594,173 B2
(45) Date of Patent: Mar. 14, 2017

(54) METHOD AND SYSTEM FOR AUGMENTING FREQUENCY RANGE OF CONVENTIONAL MARINE SEISMIC SOURCE WITH LOW-FREQUENCY

(71) Applicant: CGG SERVICES SA, Massy Cedex (FR)

(72) Inventors: Robert Dowle, Massy (FR); Hervé Richer de Forges, Massy (FR); John Sallas, Plano, TX (US)

(73) Assignee: CGG SERVICES SAS, Massy (FR)

( * ) Notice: Subject to any disclaimer, the term of this patent is extended or adjusted under 35 U.S.C. 154(b) by 367 days.

(21) Appl. No.: 14/164,636

(22) Filed: Jan. 27, 2014

(65) Prior Publication Data

US 2014/0254313 A1 Sep. 11, 2014

Related U.S. Application Data

(60) Provisional application No. 61/774,912, filed on Mar. 8, 2013.

(51) Int. Cl.
| | | |
|---|---|---|
| G01V 1/38 | (2006.01) | |
| G01V 1/133 | (2006.01) | |
| B06B 1/18 | (2006.01) | |
| G01V 1/137 | (2006.01) | |
| G01V 1/02 | (2006.01) | |
| G01V 1/04 | (2006.01) | |
| G01V 1/00 | (2006.01) | |
| G01V 1/135 | (2006.01) | |

(52) U.S. Cl.
CPC .............. *G01V 1/137* (2013.01); *G01V 1/005* (2013.01); *G01V 1/02* (2013.01); *G01V 1/04* (2013.01); *G01V 1/135* (2013.01); *G01V 1/38* (2013.01); *G01V 1/3808* (2013.01)

(58) Field of Classification Search
CPC . G01V 1/02; G01V 1/04; G01V 1/137; G01V 1/38; G01V 1/005; G01V 1/135; G01V 1/3808
USPC .......... 367/156, 139, 154, 143, 15, 140, 176
See application file for complete search history.

(56) References Cited

U.S. PATENT DOCUMENTS

| | | | |
|---|---|---|---|
| 3,949,831 A * | 4/1976 | Cassand ................. | G01V 1/135 181/114 |
| 4,210,897 A | 7/1980 | Hutchins | |
| 4,345,473 A | 8/1982 | Berni | |
| 4,557,348 A | 12/1985 | Mifsud | |
| 5,233,570 A | 8/1993 | Donskoy | |

(Continued)

FOREIGN PATENT DOCUMENTS

GB   2495800 A   4/2013

OTHER PUBLICATIONS

British Search Report in related British Application No. GB1404057.0, mailed Jun. 27, 2014.

(Continued)

*Primary Examiner* — Daniel L Murphy
(74) *Attorney, Agent, or Firm* — Patent Portfolio Builders PLLC

(57) ABSTRACT

A resonant source element configured to generate seismic waves. The resonant source element includes a housing; a high-pressure system configured to be discharged inside the housing; and a first conduit attached to an opening of the housing, wherein a distal end of the first conduit freely communicates with an ambient.

18 Claims, 20 Drawing Sheets

(56) References Cited

U.S. PATENT DOCUMENTS

| | | |
|---|---|---|
| 5,856,954 A | 1/1999 | Grall |
| 8,451,682 B2 | 5/2013 | Soubaras |
| 8,456,951 B2 | 6/2013 | Soubaras |
| 2011/0297476 A1 | 12/2011 | Harper et al. |
| 2013/0100778 A1 | 4/2013 | Ruet et al. |

OTHER PUBLICATIONS

British Search Report in related British Application No. GB1404060.4, mailed Aug. 15, 2014.

* cited by examiner

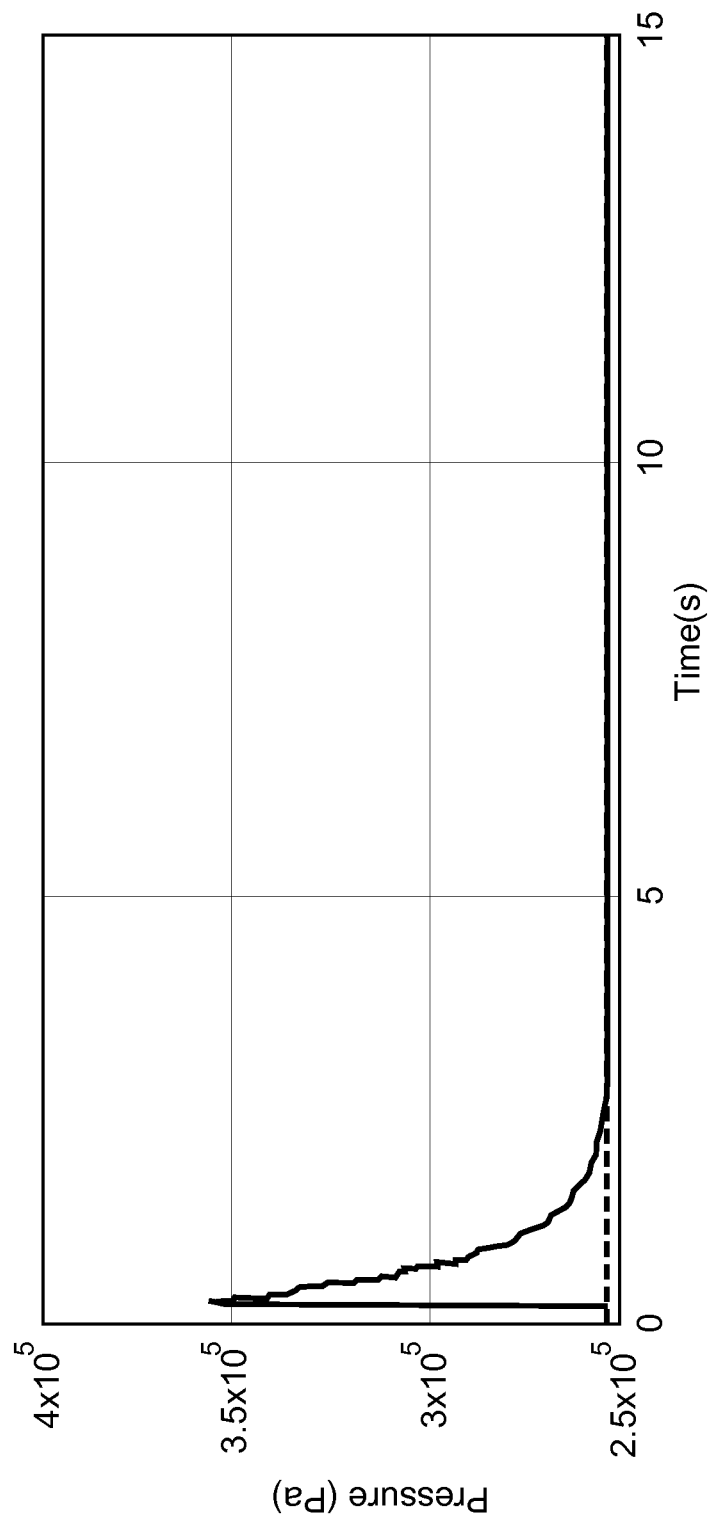

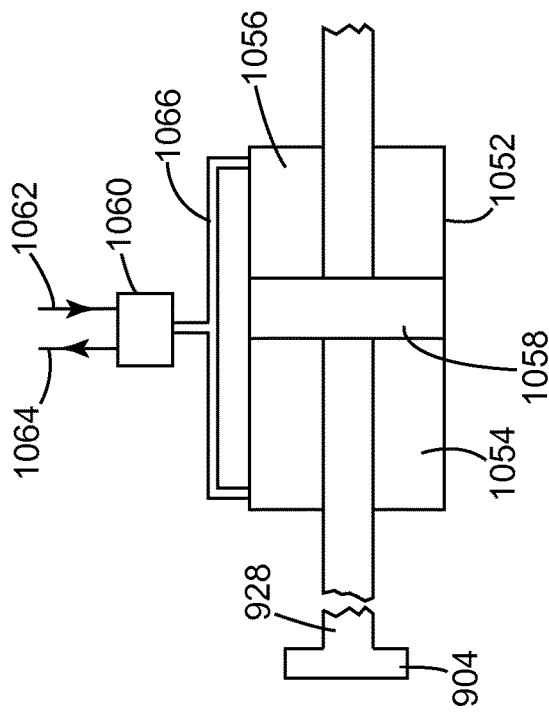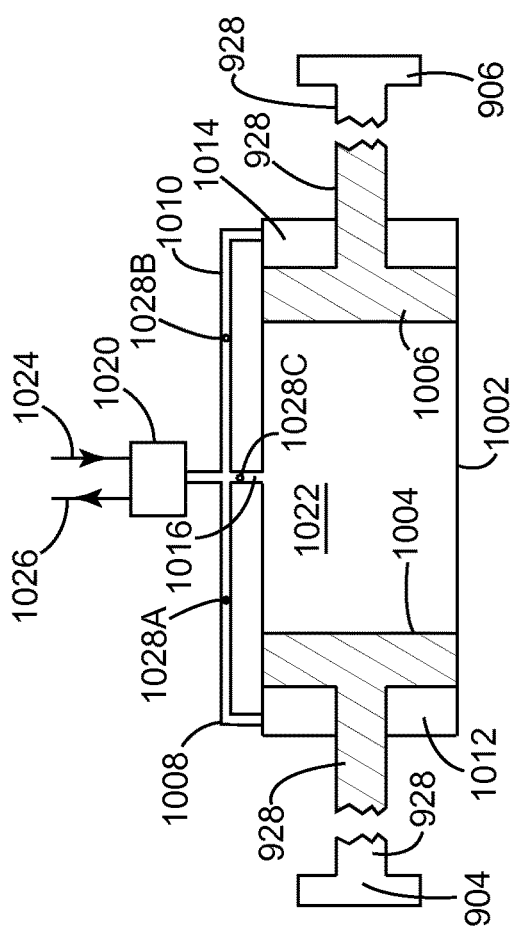
Figure 10A  980
Figure 10B  1050

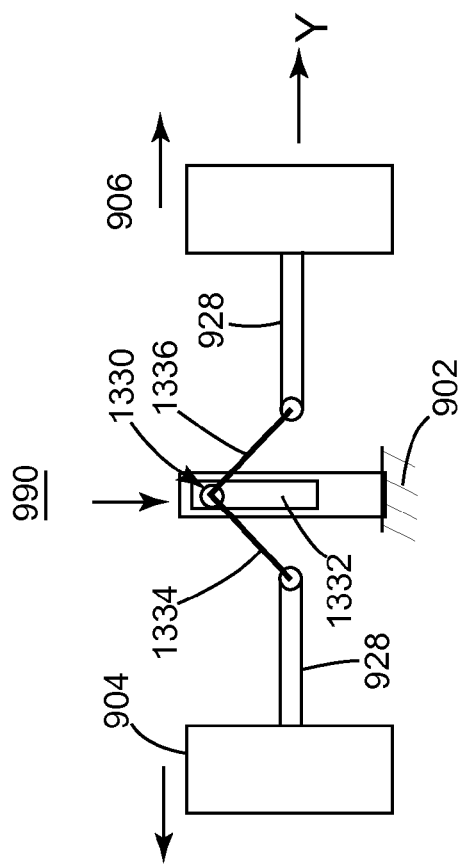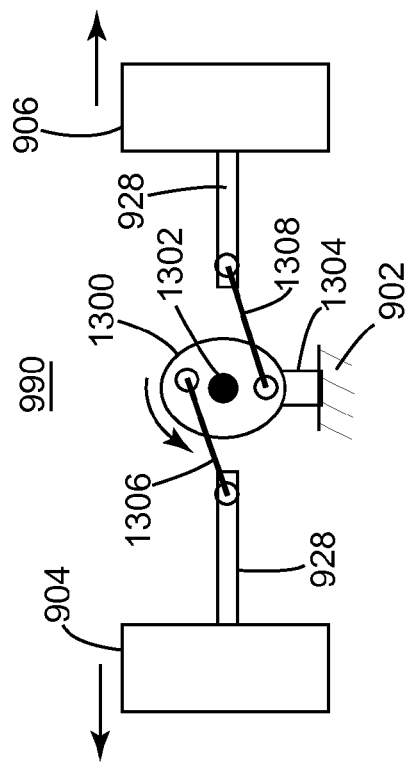
Figure 13A
Figure 13B

METHOD AND SYSTEM FOR AUGMENTING FREQUENCY RANGE OF CONVENTIONAL MARINE SEISMIC SOURCE WITH LOW-FREQUENCY

BACKGROUND

Technical Field

Embodiments of the subject matter disclosed herein generally relate to methods and systems and, more particularly, to mechanisms and techniques for increasing a low-frequency content of seismic waves generated by a marine seismic source array.

Discussion of the Background

Reflection seismology is a method of geophysical exploration to determine the properties of a portion of the earth's subsurface, information that is especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, a seismic survey system 100, as illustrated in FIG. 1, includes a vessel 102 that tows plural streamers 110 (only one is visible in the figure) and a seismic source 130. Streamer 110 is attached through a lead-in cable (or other cables) 112 to vessel 102, while source array 130 is attached through an umbilical 132 to the vessel. A head float 114, which floats at the water surface 104, is connected through a cable 116 to a head end 110A of streamer 110, while a tail buoy 118 is connected, through a similar cable 116, to a tail end 110B of streamer 110. Head float 114 and tail buoy 118 are used, among other things, to maintain the streamer's depth. Seismic sensors 122 are distributed along the streamer and are configured to record seismic data. Seismic sensors 122 may include a hydrophone, geophone, accelerometer, or a combination thereof. Positioning devices (birds) 128 are attached along the streamer and controlled by a controller 126 for adjusting a position of the streamer according to a survey plan.

Source array 130 has plural source elements 136, which typically are air guns. The source elements are attached to a float 137 to travel at desired depths below the water surface 104. During operation, vessel 102 follows a predetermined path T while source elements 136 emit seismic waves 140. These waves bounce off the ocean bottom 142 and other layer interfaces below the ocean bottom 142 and propagate as reflected/refracted waves 144 that are recorded by sensors 122. The positions of both the source element 136 and recording sensor 122 are estimated based on GPS systems 124 and recorded together with the seismic data in a storage device 127 onboard the vessel. Controller 126 has access to the seismic data and may be used to achieve quality control or even full processing of this data. Controller 126 may be also connected to the vessel's navigation system and other elements of the seismic survey system, e.g., birds 128.

A source element may be impulsive (e.g., an air gun) or vibratory. A vibratory source element is described in U.S. patent application Ser. No. 13/415,216 (herein the '216 application), filed on Mar. 8, 2012, and entitled, "Source for Marine Seismic Acquisition and Method," assigned to the same assignee as the present application, the entire content of which is incorporated herein by reference.

Presently, the air gun is the most commonly used source for marine seismic acquisition. However, neither the air gun, nor the existing vibratory source elements are effective in the low-frequency range of the spectrum, mainly in the 1 to 10 Hz range. In other words, the energy generated by the air gun in the low-frequency spectrum and the resulting received reflected energy is too weak to provide the necessary signal to noise ratio required for its successful application in seismic imaging. The low-frequency energy range is useful in seismic exploration because it provides better depth penetration of the seismic signal, which is extremely valuable for imaging in complex geological settings, such as: sub-salt, basalt or even dense carbonate. The success of advanced techniques, like seismic inversion, useful for interpretation, require energy in the low-frequency range.

Thus, there is a need to obtain the low-frequency range for seismic data for seismic interpretation. To be able to record such data, the source arrays need to be adjusted/modified to generate such low-frequency content. Therefore, it is desirable to provide source elements and methods that are capable of generating low-frequency energy.

SUMMARY

According to one embodiment, there is a low-frequency system that includes plural accelerometers located on a vessel along a given line; and a controller configured to receive information from the plural accelerometers and to generate a heave source signature associated with a heave movement of the vessel. The heave movement of the vessel generates low-frequency waves.

According to another embodiment, there is a resonant source element configured to generate seismic waves. The resonant source element includes a housing; a high-pressure system configured to be discharged inside the housing; and a first conduit attached to an opening of the housing. A distal end of the first conduit freely communicates with an ambient.

According to yet another embodiment, there is a surveying system for exploring a subsurface. The surveying system includes a high-frequency source array including plural high-frequency source elements; and a low-frequency source array including plural low-frequency source elements. A low-frequency source element includes, a housing, a high-pressure system configured to be discharged inside the housing, and a first conduit attached to an opening of the housing. A distal end of the first conduit freely communicates with an ambient.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 7A-D illustrate a pressure, displacement, far-field pressure and energy spectrum distribution for the resonant source element;

FIGS. 10A and 10B are schematic diagrams of various variable-spring devices;

FIGS. 13A and 13B are schematic diagrams of various synchronizing mechanisms;

DETAILED DESCRIPTION

Figure 1:
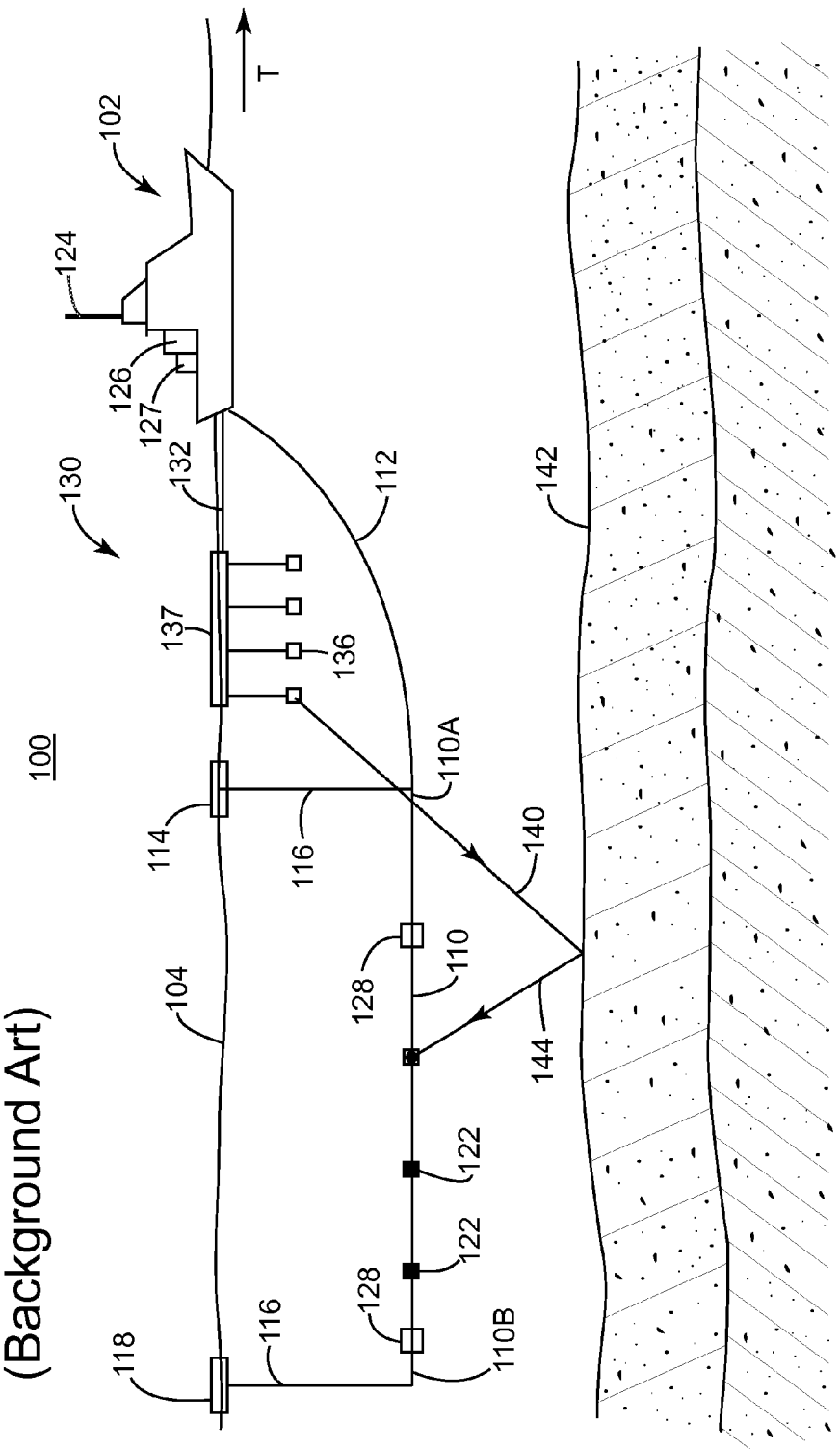
FIG. 1 is a schematic diagram of a seismic acquisition system.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a source element configured to generate low-frequency acoustic energy in a marine environment. However, the embodiments to be discussed next are not limited to a marine source element; they may be applied to source arrays (i.e., to a collection of source elements) or even to land sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a traditional source array that likely includes air guns that perform poorly in the low-frequency spectrum is augmented with one or more low-frequency source elements to improve the low-frequency spectrum. The output of various low-frequency source elements can fill in the energy often lacking in conventional marine surveys. In one application, various low-frequency source elements are constructed, each of which outputs low-frequency energy over a given portion of the low-frequency range of frequencies of interest. The low-frequency range of frequencies is mainly considered to extend from 1 Hz up to about 10 Hz. Above 10 Hz, existing air gun sources provide adequate source strength. In one embodiment, passive energy that has a very low-frequency energy content (e.g., less than 2 Hz) is generated by the vessel's heave, and this "passive source" may be combined with novel resonant source elements (to be discussed later). One such resonant source element may be powered by air guns and produce significant energy covering the 2-10 Hz frequency range. As discussed later, the novel resonant sources can be of several varieties, for example: a) source elements having a single predominant resonant peak; b) source elements having two or more dominant resonant peaks; and c) source elements that contain a variable-spring device that can be programmed to, in effect, perform a frequency sweep covering a predetermined range of frequencies. To obtain adequate energy for case "c," two or more variable-spring devices might be used with non-overlapping frequency ranges to cover the range of 2-10 Hz; for example a first source element covers the range of 2-3 Hz, a second source element covers the range of 3-5 Hz and a third source element covers the range of 5-10 Hz.

Prior to discussing novel source elements designed to generate acoustic energy in the low-frequency range, a vibratory source element is introduced, which, for simplicity, is referred to herein as a source element. A source element may have an electro-magnetic linear actuator system configured to drive a displacement member (e.g., a piston or a pair of pistons). Note that that the displacement member encompasses not only a rigid material, but also a soft material, for example, a diagram. Thus, a displacement member is a material that separates an inside of the source element from the ambient. It is possible to have a hydraulic, pneumatic, magnetostrictive or piezoelectric actuator or other appropriate mechanisms instead of the electro-magnetic actuator. A source element may be driven by an appropriate pilot signal. Plural source elements may be located together to form a source sub-array. One or more source sub-arrays form a source array. A pilot signal is designed as a source array target signal such that the total array far-field output follows a desired target energy spectrum. A drive signal derived from the pilot signal is applied to each source element. A pilot signal may have any shape, e.g., pseudo-random, cosine or sine, increasing or decreasing frequency, etc.

Figure 2A:
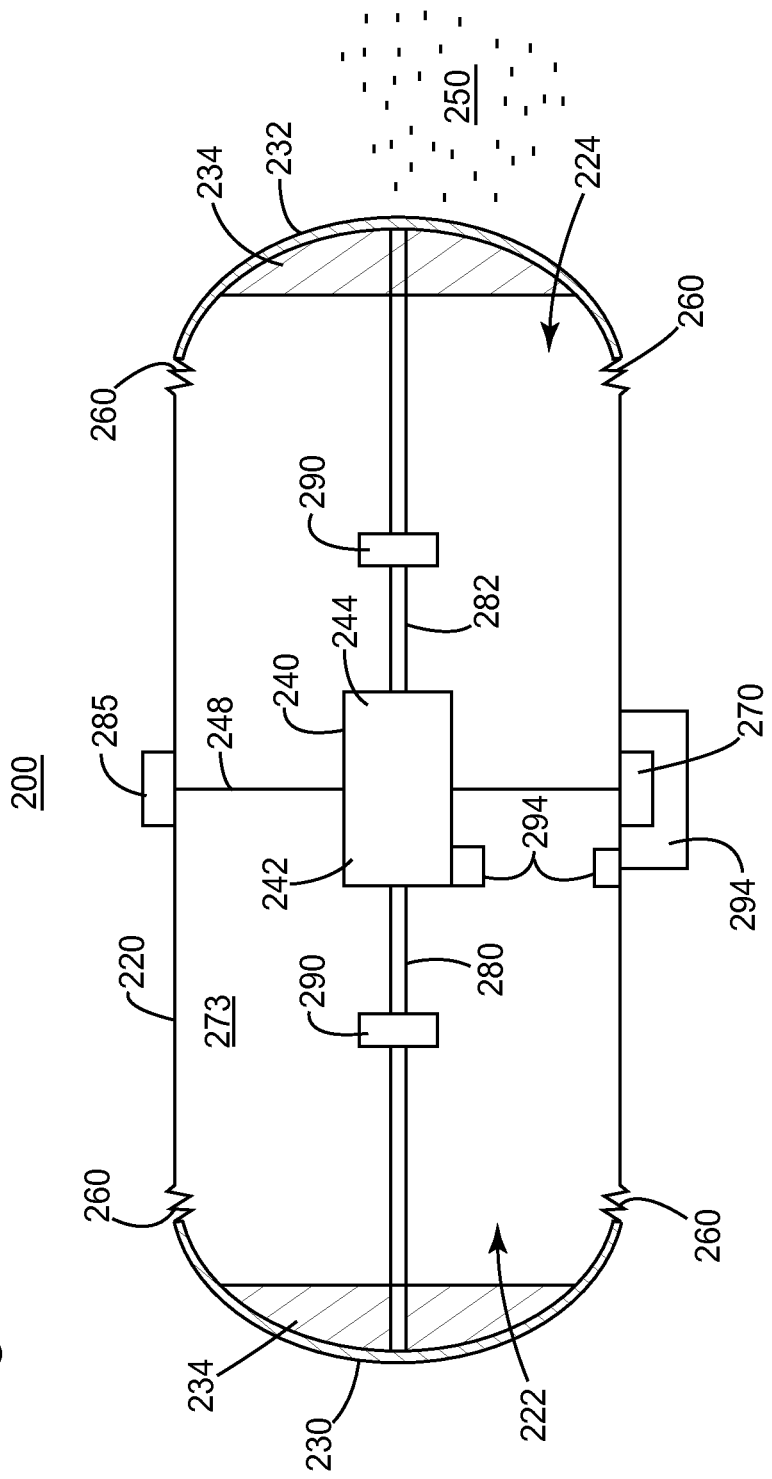
FIGS. 2A and 2B are schematic diagrams of vibratory source elements.

According to the embodiment illustrated in FIG. 2A, a source element 200 has a housing 220 that, together with pistons 230 and 232, enclose an actuator system 240 and separate it from the ambient 250, which might be water. Although FIG. 2A shows two movable pistons 230 and 232, note that a source element may have any number of pistons, e.g., one piston or more than two.

Housing 220 may be configured as a single enclosure as illustrated in FIG. 2A and have first and second openings 222 and 224 configured to be closed by pistons 230 and 232. However, in another embodiment 201 illustrated in FIG. 2B, housing 220 may include two separated enclosures 220A and 220B rigidly connected to each other by a member 202. A single actuator system 240 may be configured to simultaneously drive pistons 230 and 232 in opposite directions to generate seismic waves, as illustrated in FIG. 2A. Two actuator systems 240A and 240B may be used in the embodiment of FIG. 2B. In one application, pistons 230 and 232 are rigid, i.e., made of a rigid material, and reinforced, as will be discussed later, with rigid ribs 234. Actuator system 240 may include one or more individual electromagnetic actuators 242 and 244. Other types of actuators may be used. Irrespective of how many individual actuators are used in source element 200 or 201, the actuators are provided in pairs configured to act simultaneously in opposite directions on corresponding pistons in order to prevent source element "rocking" motion. Note that it is undesirable to "rock" the source element when generating waves because the source element's position should follow a predetermined path when towed in water.

Figure 2B:
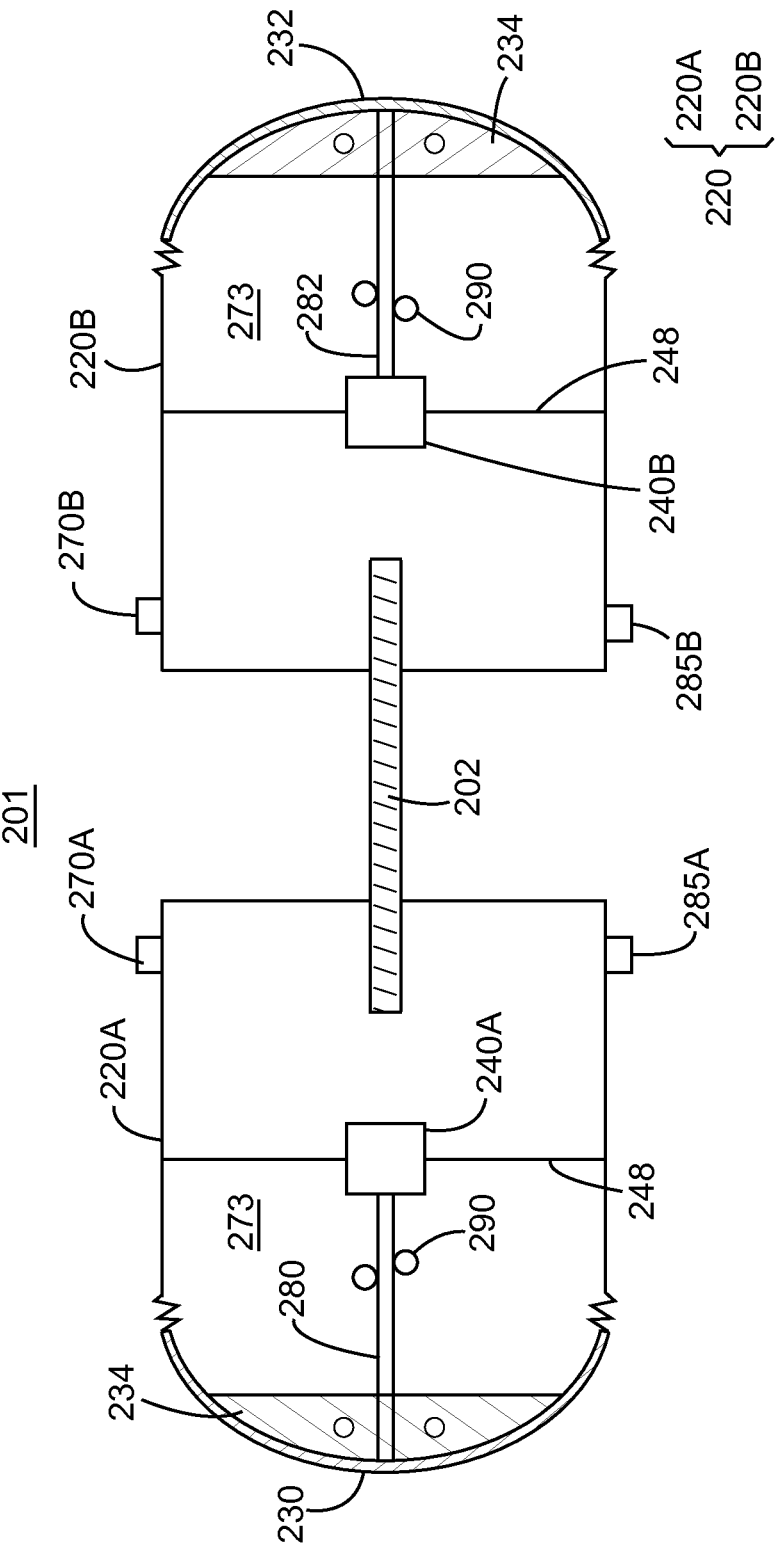

The size and configuration of the housing, pistons and actuator system depend on the source element's acoustic output. For example, a high-frequency source element (as illustrated in FIG. 2A) has smaller sizes than a low-frequency source element (as illustrated in FIG. 2B). In one embodiment, the high-frequency source element's housing length is about 1.5 m and its diameter is about 450 mm. Total housing length of the low-frequency source element is about 3 m and its diameter is about 900 mm. Thus, in one application, the low-frequency source element is substantially double the size of the high-frequency source element.

Actuator system 240 may be attached to housing 220 by an attachment 248 (e.g., a wall or a bracket). Various other components described elsewhere are illustrated in FIGS. 2A and 2B. Such components may include a sealing mechanism 260 provided between the pistons and the housing, a pressure regulation mechanism 285 or 285A and 285B configured to balance the external pressure of the ambient 250 with a pressure of a fluid 273 enclosed by housing 220 (enclosed fluid 273 may be air or other gases or mixtures of gases), one or more shafts (280 and 282) per piston to transmit the actuation motion from the actuation system 240 to pistons 230 and 232, a guiding system 290 for the shafts, a cooling system 294 to transfer heat from the actuator system 240 to ambient 250, one or more local control devices 270, 270A, 270B to coordinate the movement of these elements, etc.

According to an embodiment, a low-frequency source element may be considered to be the vessel that tows the conventional source array. The vessel can be considered to be a "passive source." The heave of the vessel, which is due to the effect of ocean swells, wind and/or streamer forces acting on the vessel, generates the seismic energy.

Figure 3:
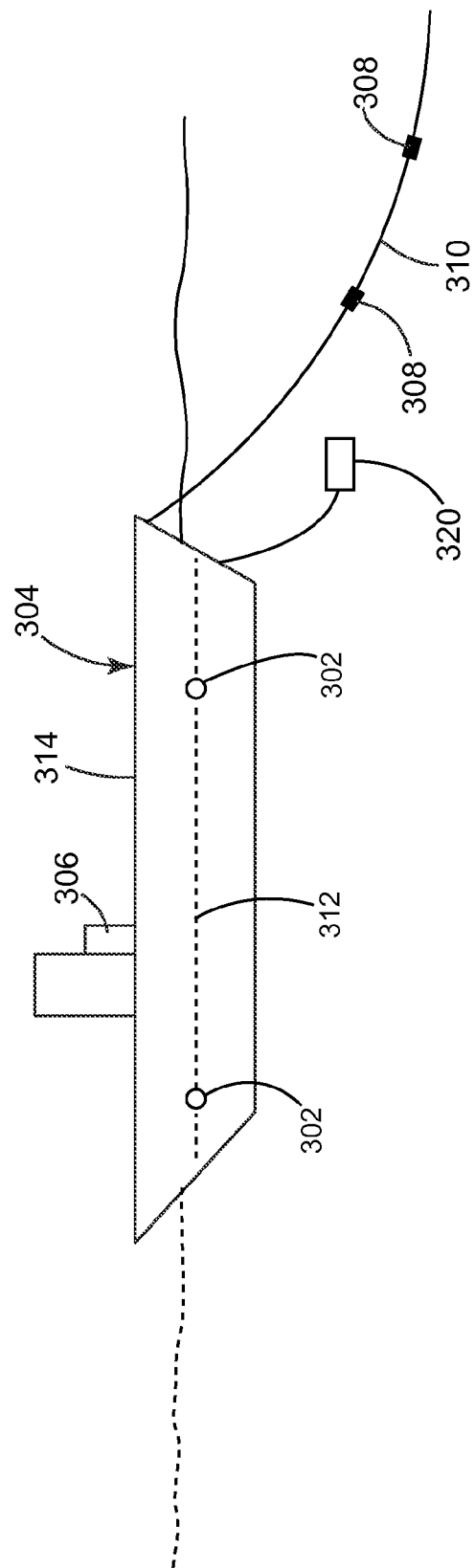
FIG. 3 is a schematic diagram of a vessel that generates low-frequency seismic waves.

Such a passive source 300 is illustrated in FIG. 3. One or more accelerometers 302 may be mounted on the vessel 304 as illustrated in FIG. 3. Accelerometer 302 can be either a single-component device (e.g., vertically oriented) or a three-component device that is capable of accurately measuring the vessel's acceleration to low frequencies, e.g., 1 Hz or less. In one application, six or more three-component accelerometers or/and an inertial unit are placed at the same level 312, below deck 314. The accelerometers may be widely spaced apart and are configured to record accelerations over long period of times, e.g., one to three minutes or continuously.

The combination of acceleration measurements is received by a controller 306 on board of the vessel and is used to estimate the overall vertical acceleration of the vessel. For example, the vertical acceleration signals may be averaged to obtain an estimate of the overall vertical acceleration of the vessel. The overall vertical acceleration of the vessel may be used as the "heave source signature." Even though heave is a very low frequency phenomenon, usually below 1 Hz, it is rich in harmonic energy. In one embodiment, the harmonic energy in the source signature that falls above 1 Hz can be used as a "passive" seismic source.

Receiver data acquired by receivers 308 distributed along the towed streamer 310 can be correlated with the "heave source signature." In one application, the "heave source signature" can be utilized as a deconvolution operator on the receiver data. Some filtering operations and other processing may be applied in the controller 306 or a land based center, that are beyond the scope of this disclosure, to produce a low-frequency data set that can be integrated with other data that was acquired simultaneously using other marine sources 320, like air guns that do not radiate very much low-frequency energy. For using the acceleration signal as a source signature, in one application, hydrophone data is collected with the air guns being inactive, for long record lengths, e.g., one to three minutes. Then, supplemental hydrophone data is collected while the air guns are being fired. The length of the recording should be long, for example, at least one minute long.

Figure 4:
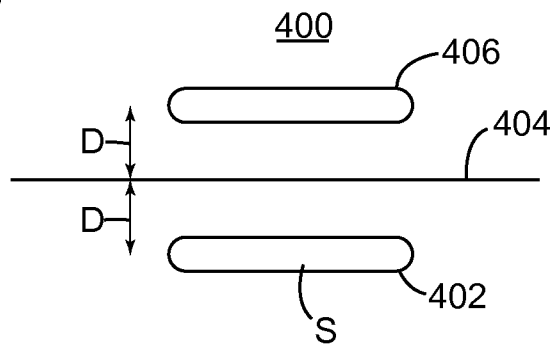
FIG. 4 is a schematic diagram of a dipole source element.
Figure 5A:
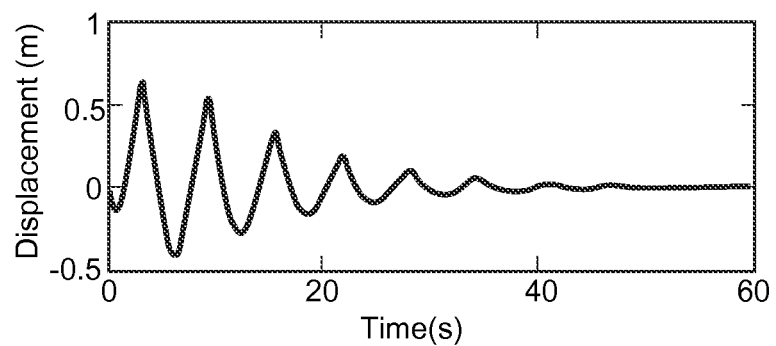
FIGS. 5A-C illustrate a displacement, acceleration and energy spectrum distribution for a heave motion of a vessel.
Figure 5B:
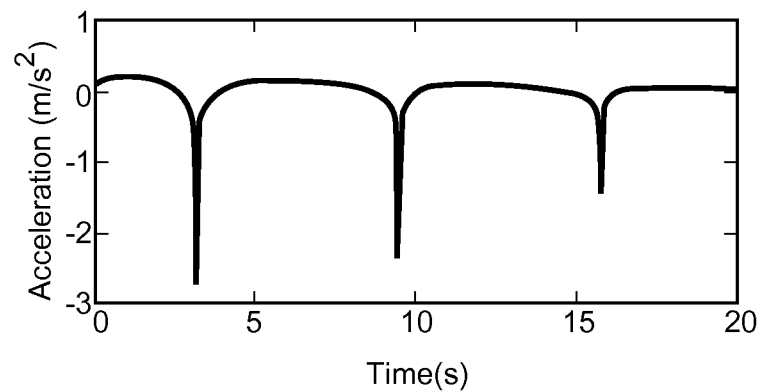
Figure 5C:
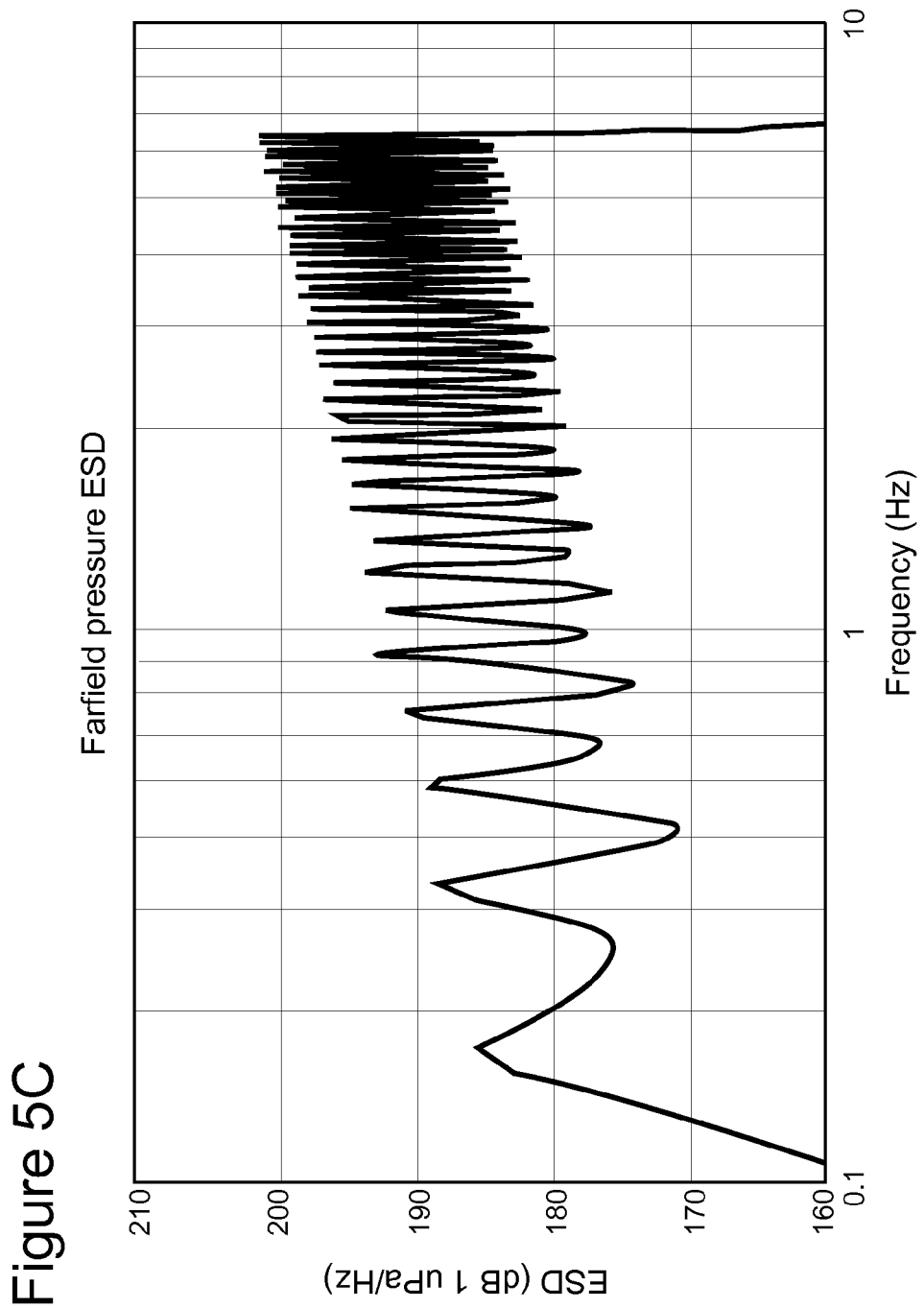

The wavelength corresponding to a 10 Hz wave is about 152 m, and thus, because the vessel has a length less than 152 m, it is likely to still be considered a point source over the low-frequency range. As illustrated in FIG. 4, vessel 400 acts as a dipole source, with one monopole 402 being the bottom of the vessel, which is at a depth D relative to sea surface 404, and acts like a giant piston and the other monopole 406 being a virtual source (of opposite polarity) above the sea surface 404 due to the surface reflection effect. A down-going far-field pressure P at a frequency f referred to 1 m for the dipole source is given, in one embodiment, by $$P(f) = \frac{\rho \cdot S \cdot A(f)}{4 \cdot \pi}(1 - e^{-j \cdot 2 \cdot \pi \cdot f \cdot 2 \cdot D})$$

where ρ is the water density, S is the surface of the monopole 402, A(f) is the heave acceleration spectrum, D is the depth of monopole 402 relative to sea surface and j is square root of minus one. FIG. 5A illustrates the heave displacement versus time, FIG. 5B illustrates the heave acceleration versus time and FIG. 5C illustrates the far-field energy spectrum distribution (ESD) over frequency for source 400.

Another novel source element, called herein the resonant source element, is now described. A resonant source element generates at least a single resonance frequency. The resonant source element may be used as a standalone source. However, it is believed that the resonant source element is better used in tandem with a traditional source array to boost the low-frequency content of the energy imparted to the water during shooting. There are a few different designs for the resonant source element and they are as discussed with reference to the drawings.

Figure 6:
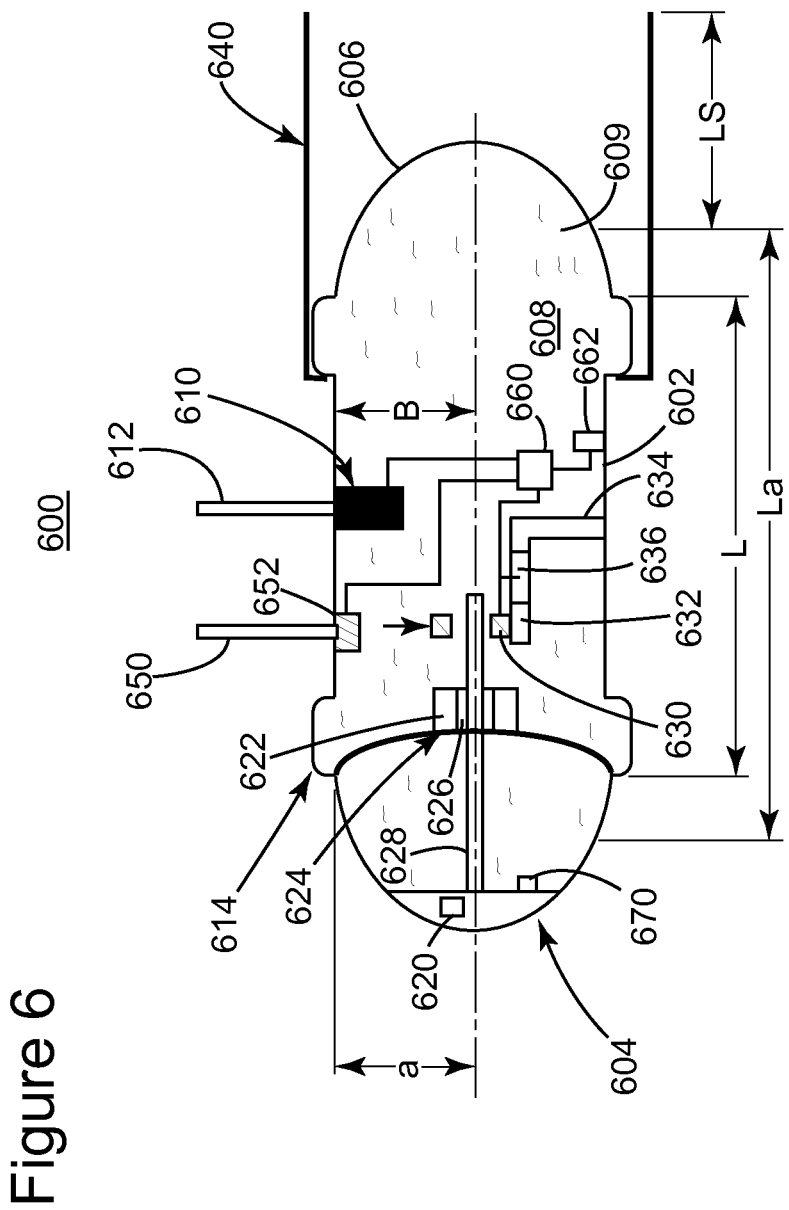
FIG. 6 is a schematic diagram of a resonant source element.

In one embodiment, a resonant source element 600 is illustrated in FIG. 6 and includes a housing 602 and two pistons 604 and 606 that define an enclosure 608. The twin pistons are excited by firing a high-pressure system, for example, an air gun 610 inside enclosure 608. In one application, the high-pressure system may include a valve connected to a high-pressure source, or a rotating sleeve system or an engine type valve that can deliver high-pressure air. For simplicity, the following embodiments are discussed with regard to air gun 610. Air gun 610 may be a traditional air gun and may be located inside enclosure 608 as illustrated in FIG. 6. Note that for simplicity FIG. 6 illustrates various elements, to be discussed later, only for piston 604 and not for piston 606. While this arrangement is possible, another embodiment has the same elements for both pistons. Air gun 610 has a supply line 612, which may be include one or more of compressed air, electric power, data, etc. In one application, the air gun is located outside housing 602 or partially inside and partially outside housing 602. The two pistons on either side of enclosure 608 are free to move, i.e., there is no active actuator, except the air gun, that imparts movement to their shafts 628. Seals or bellows 614 (e.g., made of Kevlar reinforced rubber) connect the pistons to the housing 602 for preventing sea water entering enclosure 608 and also for maintaining the pistons attached to housing 602.

When the air gun is fired inside enclosure 608, housing 602 is pressurized, causing pistons 604 and 606 to move outward. The combined (i) piston mass and (ii) acoustic radiation mass of the water acts like a single mass load with the trapped air 609 inside the enclosure acting like an air-spring. The housing's air-spring and mass loading of the pistons create a resonance effect that creates a vibratory acoustic source signal.

To adjust the resonant frequency of this source element, various mechanisms may be used. In one application, a first mass 620 may be added to each piston. However, this is a passive adjustment mechanism because once the source element is deployed underwater, this first mass cannot be further adjusted.

A second resonance can be added to the frequency spectrum of the source element by using a second mass 622 and a spring 624. The second mass can be sized and positioned to counter both the moments/torque due to the pressure gradient and due to the displaced piston water volume mass. In one application, second mass 622 is attached to spring 624, which may be a leaf spring. Spring 624 is fixed to piston 604. A bearing mechanism 626 may be located between the second mass 622 and shaft 628 (attached to piston 604) so that shaft 628 does not displace mass 622.

A brake mechanism 630 may be distributed next to shaft 628 for making the piston 604 sweep through a range of frequencies. Brake mechanism 630 may be a mechanical device comprised of opposing brake pads that have a ceramic or metallic lining, similar to what are used in automobile disc brakes, that are connected to a small pneumatic or electrical actuator that when activated cause the brake pads to clamp down on a flat surface that is part of the piston rod (the piston rod for example could have some ground flats on it). The brake actuators could have a spring to disengage the brake when the brakes are not used. Brake mechanism 630 may be attached to a fixed structure 634, inside housing 602, through a spring mechanism 632 and damping mechanism 636. The damping mechanism dampens the brake mechanism's motion. The damping mechanism may be a dashpot system that includes a viscous damper that could be engaged at some predetermined time to act like a brake to stop the piston so that a fixed length source signal can be maintained.

The resonant source element may also include an optional external piston shroud 640, which tends to increase the radiation mass loading on the pistons, thus providing a means to reduce the resonant frequency without having to add more structural mass. In one application, a synchronizer unit can be used to ensure that the pistons move simultaneously inward and outward. A vent pipe 650 may connect enclosure 608 to outside, i.e., either to air above sea surface or the ambient water. A check valve 652 may be located along the vent to prevent the sea water entering the enclosure. Vent pipe 650 may be used to remove air from inside the enclosure to bring the pistons back to their inward positions.

In one application, a controller 660 may be provided on or in the resonant source element to control and/or coordinate one or more of the source's components, e.g., brake mechanism, valve, air gun, damping mechanism 636, etc. Electric power for the controller 660 may be supplied from an external source, through supply line 612 or from a local source 662, which may be a battery, fuel cell, hydrogenerator, etc. Other equipment may be located on resonant source element 600, as for example, a sensor 670, which may be located inside or outside housing 602. Sensor 670 may be an accelerometer for measuring a movement of piston 604 or a hydrophone, if placed outside housing 602, for determining a near-field signature of the resonant source element. Other sensors may be used.

Figure 7B:
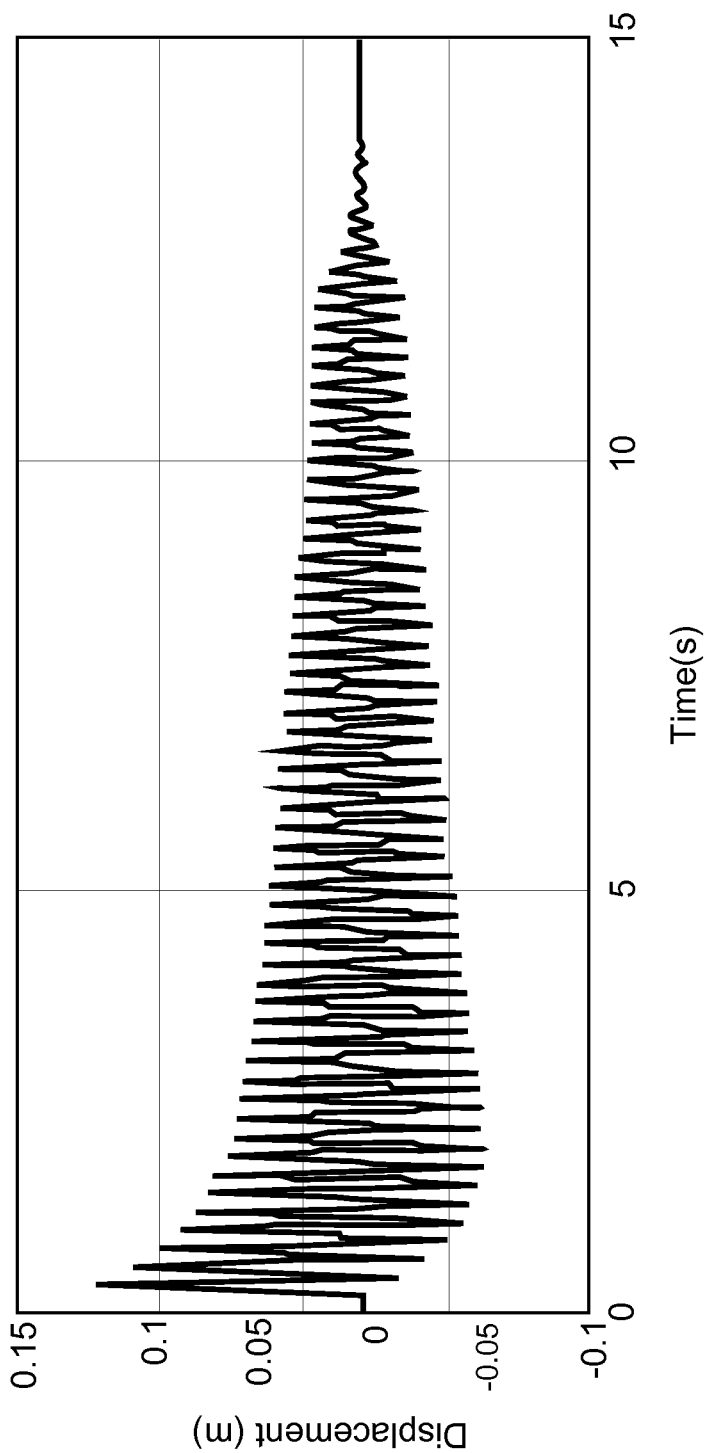
Figure 7C:
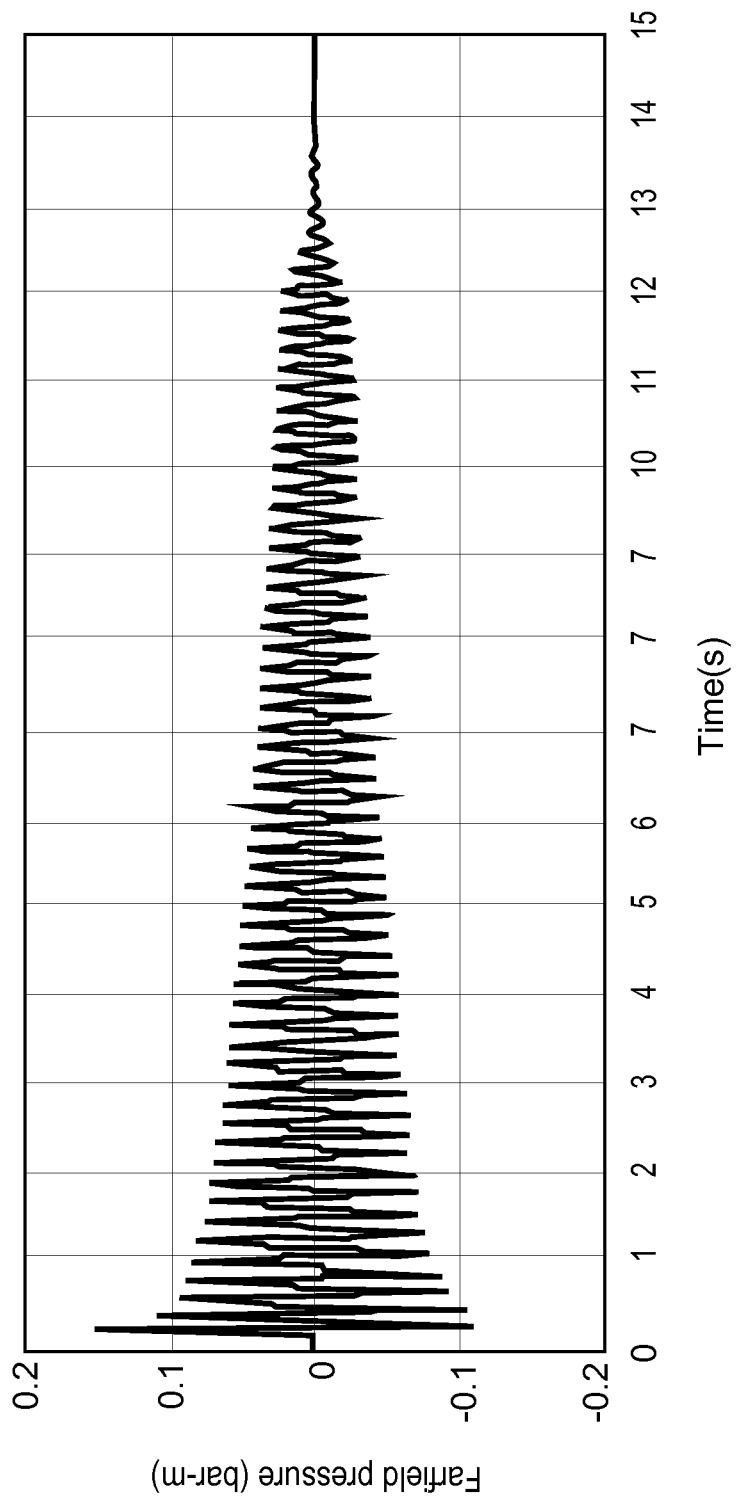
Figure 7D:
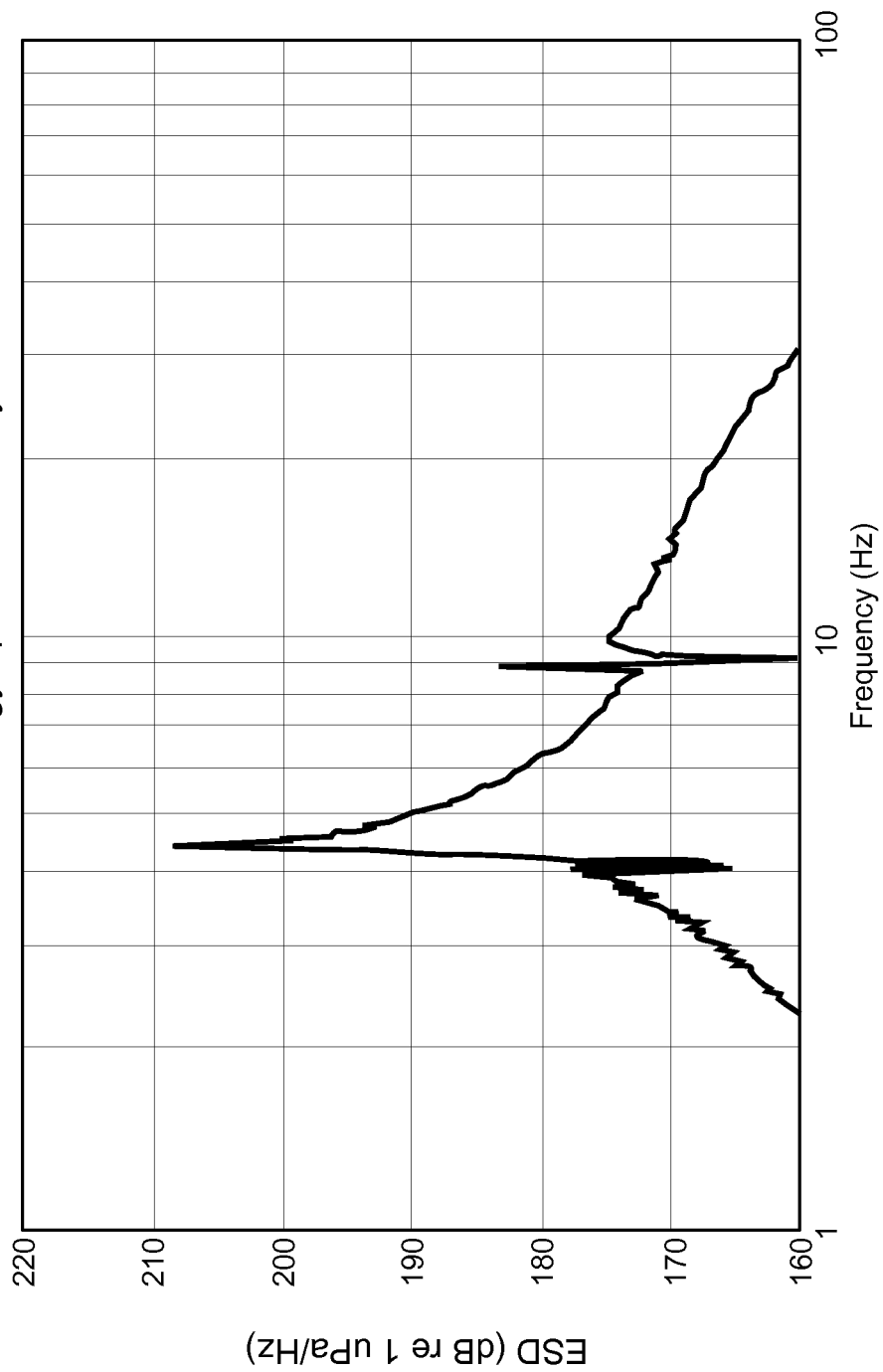

FIG. 6 also illustrates a piston radius "a," the housing effective length L in the starting position, a shroud length Ls, and an acoustic distance La between the pistons if no shroud is present. A far-field pressure of the resonant source element illustrated in FIG. 6 may be calculated by considering a superposition of four contributions: volumetric acceleration of piston 604, ghost of piston 604, piston 606 and ghost of piston 606. Based on this model, a pressure inside the housing is calculated and illustrated in FIG. 7A during a 10 s time interval, with the air gun being shot at time zero, a corresponding piston displacement is illustrated in FIG. 7B, the signature of the resonant source element corresponding to the conditions illustrated in FIGS. 7A and 7B are illustrated in FIG. 7C, and the ESD of the source operating at a depth of about 15.2 m with a single resonant frequency 700 is illustrated in FIG. 7D. Resonant frequency 700 explains the name of "resonant source element."

Figure 8:
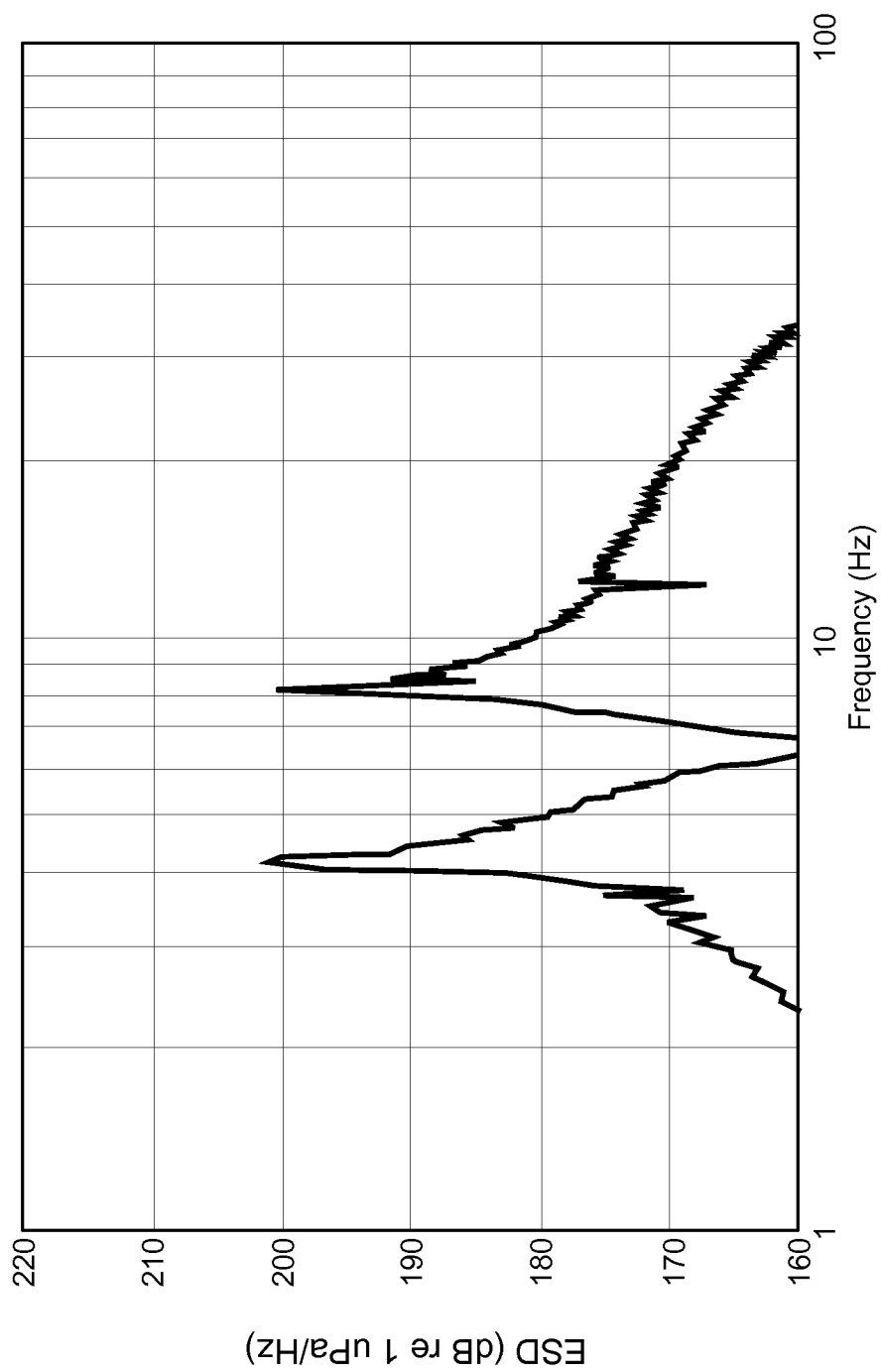
FIG. 8 illustrates an energy spectrum distribution with two resonant frequencies.

From the studies performed on the resonance source element under various conditions, e.g., with and without brake, etc. it was observed that this source element can produce large peaks that cover the 0-2 Hz frequency bandwidth in the ESD. To achieve a continuous spectrum from 2 to 10 Hz, a certain number of such source elements may be necessary. Increasing the damping lowers the peaks but does not broaden the energy spectrum. It is more advantageous to have long records for these sources. If the record is short, it appears to be better to use less damping and then to apply the brake because several cycles of high amplitude are obtained before damping begins. The shrouds help to lower the resonant frequency, but long shrouds may pose an operational problem for handling equipment, especially when trying to deploy or recover long sources. A practical tradeoff between shroud length and frequency extension makes it difficult to extend the resonant frequency below 3.5 Hz. By adding the second mass 622, a second resonance frequency 802 appears in addition to the first resonance frequency 800, as illustrated in FIG. 8. FIG. 8 represents the resonant source element's ESD over frequency when second mass 622 has been added.

Note that for a seismic survey, several of these swept frequency resonant source elements could be used simultaneously, with each source element covering a unique portion of the frequency range of interest, for example, a first source element covering the band of 2-3 Hz, a second source element covering the band of 3-5 Hz and a third source element covering the band of 5-10 Hz so that the entire low-frequency band of 2 to 10 Hz is covered. The piston accelerations for the resonance source elements in a source array can be recorded and combined for use as either a correlation operator or for use as an input to a source signature deconvolution routine.

Figure 9:
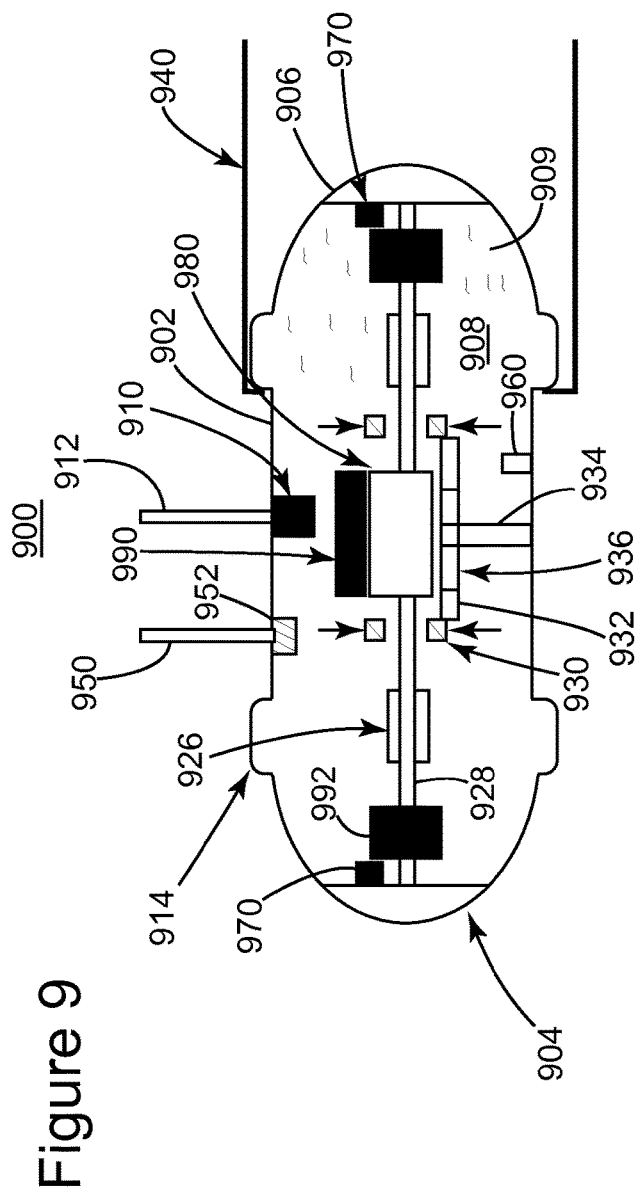
FIG. 9 is a schematic diagram of a resonant source element with varying frequencies.

According to another embodiment, by including a variable-spring device that acts in combination with the housing's air-spring, the resonant frequency can be varied in real time. In effect, the resonant source element with variable-spring device may be programmed to cover a range of frequencies, similar to chirp or frequency sweep. FIG. 9 illustrates one possible variable-spring resonant source element 900. Source element 900 has many components similar to source element 600 and for this reason, those components are not described again. Source element 900 has a new component, a variable-spring device 980. Variable-spring device 980 may be a pneumatic air cylinder whose internal air pressure can be changed to vary its spring rate to produce a "frequency sweep." Source element 900 may also include a piston synchronizer mechanism 990, which will be discussed later. Variable-spring device 980's outer cylinder is rigidly attached to housing 902 via bracket 934.

In one embodiment illustrated in FIG. 10A, the variable-spring device 980 has a body 1002 that accommodates pistons 1004 and 1006. Note that pistons 1004 and 1006 are different than pistons 904 and 906 in FIG. 9. Each piston is attached to a corresponding shaft 928 to which pistons 904 and 906 of resonant source element 900 are attached. Conduits 1008 and 1010 are attached to body 1002 and fluidly communicate with chambers 1012 and 1014, respectively, which are formed by pistons 1004 and 1006 with body 1002. A three-way valve 1020 fluidly communicates with conduits 1008 and 1010 and also with inside chamber 1022 through a conduit 1016. Valve 1020 may be another type of valve or may include plural single way valves. Inside chamber 1022 is sandwiched by pistons 1004 and 1006. Three-way valve 1020 is connected to a supply line 1024 and a vent line 1026. Supply line is configured to supply, for example, compressed air while vent line is configured to remove the pressurized air from inside chamber 1022. Orifices 1028A-C or equivalent structures may be located on each conduit 1008, 1010 and 1016 so that an airflow between the chambers is possible but reduced.

When in use, at the start, the pressure inside each chamber of housing 1002 is low, for example, atmospheric pressure. When the air-gun is fired, the three-way valve 1020 is shut. However, right after firing the air-gun, high-pressure air flows into all three chambers 1012, 1014 and 1022. This increases the spring rate of the variable-spring device 980. The three orifices 1028A-C make sure that the spring effect is preserved since rapidly changing pressures between the various chambers is blocked by the orifices and yet, the orifices allow the pressure to slowly rise as compressed air is introduced by the three-way valve. As the compressed air is introduced, the spring rate of the variable-spring device 980 increases thus, changing the frequency of the source element. At the end of the shot time, the brake mechanism 930 is applied to stop the movement of the pistons 904 and 906 and then, the compressed air is vented to the atmosphere through vent line 1026 to reset the variable-spring device. Note that an increased pressure in the chambers acts similar to introducing a spring between the shaft ends of the pistons 904 and 906 and housing 902. Thus, by changing the air pressure within the inside chambers, the spring rate of the source element is modified.

Another variable-spring device 1050 is illustrated in FIG. 10B. The variable-spring device 1050 needs to be attached to each shaft 928 of the source element. Note that only one variable-spring device 980 was necessary in the embodiment of FIG. 10A. Variable-spring device 1050 has a housing 1052 which is split into two chambers 1054 and 1056 by a piston 1058. A three-way valve 1060 fluidly connects chambers 1054 and 1056 to a supply line 1062 and a vent line 1064. To increase the spring rate, compressed air is supplied to both chambers 1054 and 1056, for example, after the air-gun has been fired, while pistons 904 and 906 still oscillate. Distribution lines 1066 provide the compressed air to both chambers. When the brake is applied, the excess air is removed from both chambers through vent line 1064.

Figure 11:
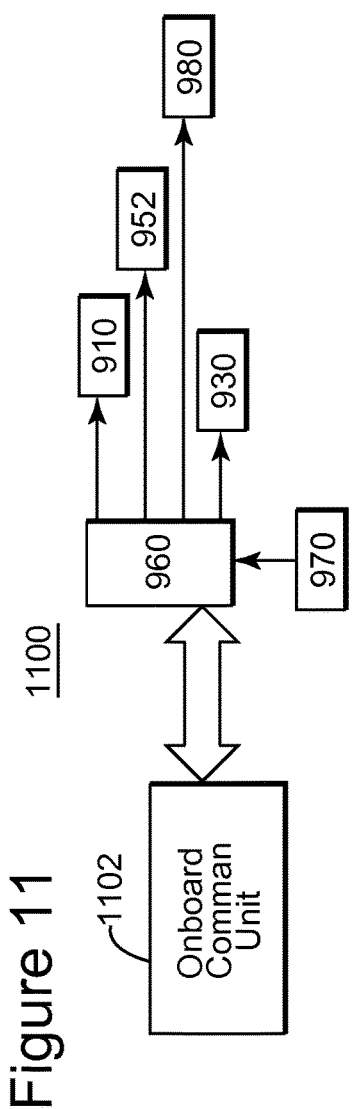
FIG. 11 is a schematic diagram of a control mechanism.
Figure 12:
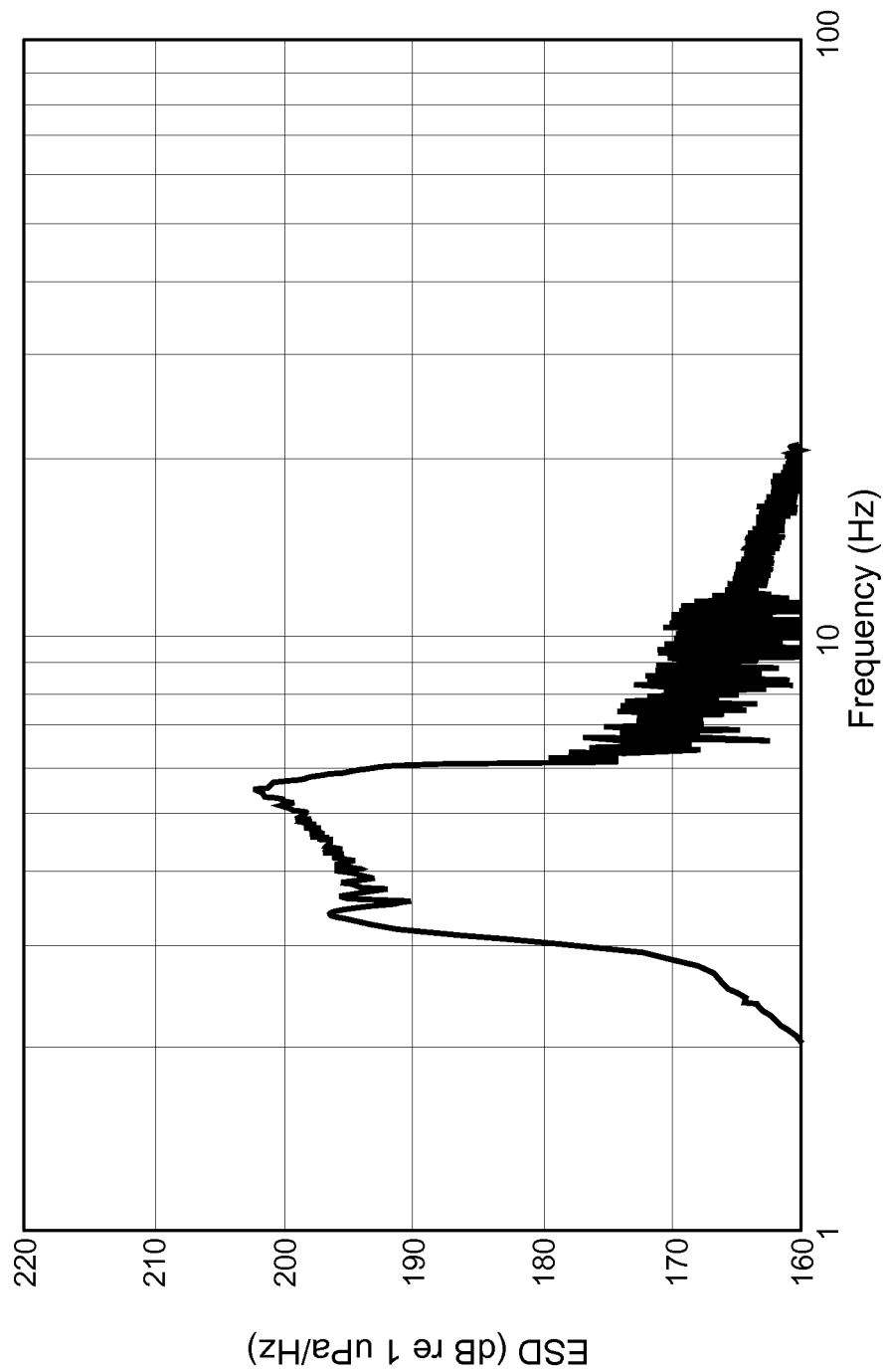
FIG. 12 is an illustration of a swept frequency for a resonant source element with a variable-spring device.

In one embodiment, a resonant source element with a variable-spring device is actuated as now described. The housing 902 is initially at hydrostatic pressure, i.e., at the ambient pressure. Brake mechanism 930 is off and the chambers of the variable-spring device are at a low pressure. A global control unit 1100, as illustrated in FIG. 11, that includes a controller 1102 located, for example, on the towing vessel, instructs the unit to fire. This command is received at a local controller 960, located on the resonant source element. Local controller 960 triggers air-gun 910, which releases a large pressure inside enclosure 908. This increased pressure makes pistons 904 and 906 to move outward and then vibrate. Their motion is affected by their mass, an additional mass 992 fixedly added to shaft 928 and by the air pressure inside the variable-spring device 980. Controller 960 controls variable-spring device 980, e.g., the position of valve 1020 or 1060 to allow the compressed air to enter inside the variable-spring device while pistons 904 and 906 oscillate, to increase the spring constant. When the pistons have vibrated enough time, e.g., a predetermined time, controller 960 applies the brake mechanism 930 to stop pistons 904 and 906's movement and release the compressed air from inside the variable-spring device 980 through vent line 1026 or 1064 by appropriately positioning valve 1020 or 1060, respectively. Three-way valve may be any known valve, for example, a solenoid actuated valve. Vent lines 1026 and 1064 may be connected to vent line 950 or directly to the outside of the resonant source element. Supply lines 1024 and 1062 may be connected to supply line 912 or directly the vessel. If supply lines 1024 and 1062 are connected to supply line 912, an appropriate valve (not shown) may be installed to control when the compressed air is supplied to the air-gun or to valves 1020 or 1060. The ESD of such a source 900 is illustrated in FIG. 12, and note that the ESD between 4 and 8 Hz looks like a sweep. By changing various parameters of the resonant source element with variable-spring device, this sweep may be adjusted.

Returning to FIG. 9, a piston synchronizer mechanism 990 may be located inside housing 902 for synchronizing a movement of pistons 904 and 906. Because these pistons are free to move inside housing 902, because there are no actuators physically linked to the pistons, it may be possible that in time, one piston moves faster or slower than the other pistons, e.g., because of different friction between the pistons and housing. To prevent this, in an embodiment illustrated in FIG. 13A, the synchronizer mechanism 990 has a rotating part 1300 that is configured to rotate around an axis 1302 relative to a support member 1304, that may be fixedly attached to housing 902 of the resonant source element 900. Arms 1306 and 1308 connect corresponding shafts 928 to rotating part 1300 so that when one piston 904 moves, the other piston 906 is forced to move with the same displacement in the opposite direction. Rotating part 1300 may be circular or have an oval shape and allows arms 1306 and 1308 to rotate relative to their connection points.

FIG. 13B illustrate another embodiment in which the synchronizer mechanism 990 has a moving part 1330, e.g., a roller, configured to move inside a track 1332. Moving part 1330 is connected to arms 1334 and 1336 so that when moving part 1330 moves along track 1332, arms 1334 and 1336 synchronize a translational movement of pistons 904 and 906 along a given direction Y. In one embodiment, track 1332 is a straight line, substantially perpendicular on given direction Y. Those skilled in the art would recognize that other synchronizer mechanisms may be used as long as they force both pistons 904 and 906 to move at the same time along their given direction Y.

Figure 14:
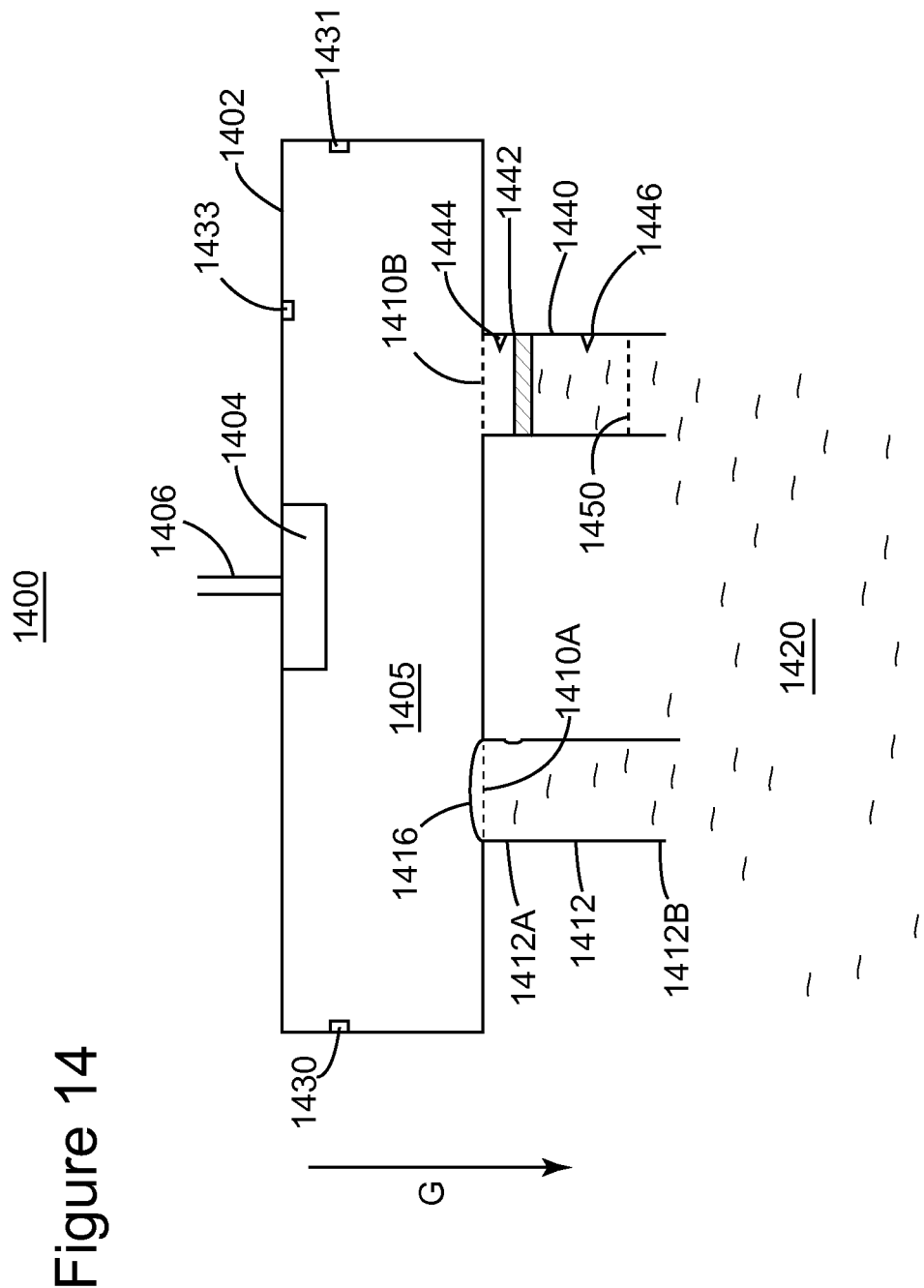
FIG. 14 is a schematic diagram of another source element.

According to yet another embodiment, a different source element 1400 may include, as illustrated in FIG. 14, a housing 1402 that accommodates a high-pressure system 1404, e.g., an air gun, a rotating sleeve system or an engine type valve. For simplicity, air gun 1404 is considered in the next embodiments. Air gun 1404 may be supplied with compressed air through a supply line 1406. Housing 1402 may have one or more openings 1410A-B that communicates with the ambient. Opening 1410A may be connected to a conduit 1412, e.g., a pipe, opened at both ends. One end 1412A directly communicates with an interior of housing 1402 while the other end 1412B directly communicates with the ambient. In one application, a flexible member 1416 separates the inside 1405 of housing 1402 from ambient (e.g., sea water) 1420. A length and diameter of conduit 1412 (which may have a square, circular or any other cross-sectional shape) may be calculated function of the frequency to be emitted. Before firing, chamber 1405 is filled with air at ambient pressure. When in action, the air gun 1404 is fired, which increases the pressure inside housing 1402, making it larger than a pressure of the ambient 1420. This pressure difference causes air to deform flexible member 1416 and to displace the water volume inside conduit 1412, which creates a seismic wave. The water column in conduit 1412 continues to oscillate for a given time, moving up and down relative to gravity G, until the air pressure inside housing 1402 is returned to the ambient pressure and the water level rises to the original level. Air pressure inside housing 1402 may return to ambient pressure using various approaches, for example, a one way valve 1430 attached to housing 1402, venting the air through a venting conduit (not shown), etc. Note that an orifice of valve 1430 is made small to avoid the loss of low frequencies.

Source element 1400 may include a second conduit 1440 having, for example, a structure identical to first conduit 1412. However, second conduit 1440 may be different in shape and/or size than the first conduit. In one application, second conduit 1440 may have a different configuration than the first conduit. For example, second conduit 1440 may include a displacement member 1442 (e.g., a piston or a float) instead of a flexible member 1416, which can move inside the conduit between stoppers or screens 1444 and 1446. Same stoppers or screens 1444 and 1446 may be placed in conduit 1412, to sandwich member 1416. In one application, a damper 1450 may be located inside any of the conduits to damp an oscillation of the water column and/or displacement member 1442. In one application, damper 1450 is located toward an end of the conduit facing the ambient. The damper can take the form of a screen, perforated metal, nozzle or anything else that might act as partial restriction to the flow of water to create a viscous damping effect. The source element may have any number of conduits. It is also possible that both conduits could include displacement members 1442.

In another application, instead of using valve 1430 together with flexible membrane 1416, a relief valve or poppet valve 1431 may be located near the top of housing 1402 and it could be adjusted so that it opens when the internal pressure in housing 1402 exceeds some preset level, slightly greater than ambient pressure. The relief valve's opening pressure could be preset to stay open until the water level raises to a starting level in conduit 1412. Alternatively, a pressure sensor 1433 or a water level detector may be located at location 1430, inside housing 1402, and a measurement of this device may be used as an input to a solenoid driven poppet valve so that the poppet valve is shut when the air gun is fired and the water column reverberates in conduit 1412b, but then the valve opens until the water level rises to its starting position or equivalently the housing pressure is slightly above ambient pressure. According to this embodiment, the flexible membrane fully isolates the interior of housing 1402 from seawater and keeps out anything that might foul the inside equipment.

Figure 15A:
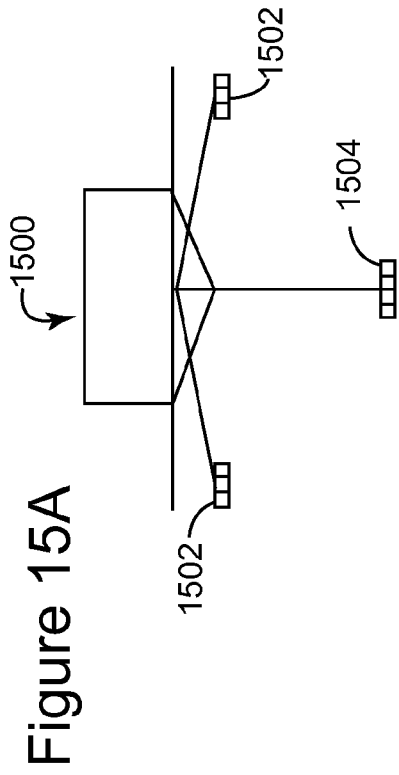
FIGS. 15A and 15B are schematic diagrams of a source array with low-frequency source elements.

When implemented in an actual seismic survey system, a seismic source array 1500 having one or more of the source elements discussed above may have, as illustrated in FIG. 15A, two high-frequency sub-arrays 1502 and a single low-frequency sub-array 1504 that includes any of the low-frequency source elements discussed herein. Other configurations may be possible. Each sub-array may have plural source elements as discussed above. In one application, the high-frequency sub-arrays 1502 are towed at a depth of about 5 m, while the low-frequency sub-array 1504 is towed at a depth of about 25 m.

A side view of a marine acquisition system 1506 that includes seismic sources as discussed above is illustrated in FIG. 15B. System 1506 includes a towing vessel 1508 that tows the seismic array 1500. Seismic array 1500 may include, as discussed with regard to FIG. 15A, one or more high-frequency sub-arrays 1502 positioned at a depth H1 and one or more low-frequency sub-arrays 1504 positioned at a depth H2, where H2 is deeper than H1. Depth controllers 1510 may be located on or next to each sub-array for maintaining a desired depth. Umbilicals 1511 connect each sub-array to vessel 1508. An umbilical may include a strength member, command and data capabilities, electrical power, and pneumatic air supply.

A mechanical interface 1512 connects corresponding umbilical components to a pneumatic supply system 1514, a power supply system 1516, and a command and control device 1518. Command and control device 1518 may include a processing unit, as described later, that is capable to receive and process seismic data for imagining the surveyed subsurface. Command and control device 1518 may also be configured to control a trajectory of the seismic source, adjust its trajectory and control the shooting of the source elements. Command and control device 1518 may interact with the vessel's navigation system.

Figure 15B:
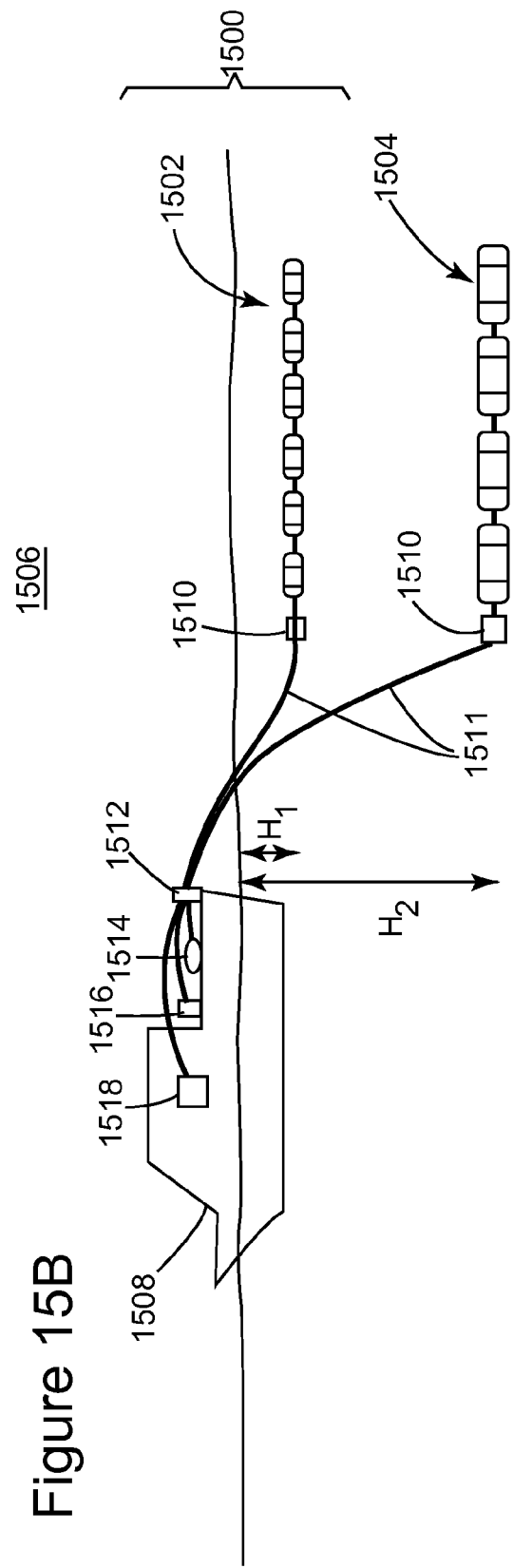

Although FIG. 15B shows each sub-array having a horizontal distribution, note that a multi-level source array may be used instead of horizontal source sub-arrays 1502 and/or 1504. The above embodiments were discussed without specifying the type of seismic receivers used to record seismic data. In this sense, it is known in the art to use, for a marine seismic survey, streamers towed by one or more vessels, and the streamers include seismic receivers. The streamers may be horizontal, slanted or have a curved profile as disclosed, for example, in U.S. Pat. Nos. 8,456,951 and 8,451,682, the entire contents of which are incorporated herein by reference.

Figure 16:
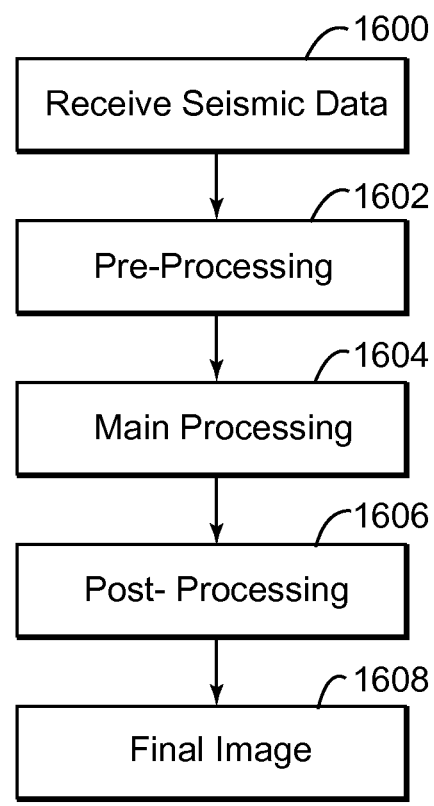
FIG. 16 is a flowchart of a method for processing seismic data.

Seismic data generated by the seismic sources discussed above and acquired with the streamers also noted above may be processed in a corresponding processing device for generating a final image of the surveyed subsurface as discussed now with regard to FIG. 16. For example, the seismic data generated with the source elements as discussed with regard to FIGS. 3, 6, 9 and 14 may be received in step 1600 at the processing device. In step 1602, pre-processing methods are applied, e.g., demultiple, signature deconvolution, trace summing, motion correction, vibroseis correlation, resampling, etc. In step 1604, the main processing takes place, e.g., deconvolution, amplitude analysis, statics determination, common middle point gathering, velocity analysis, normal-move out correction, muting, trace equalization, stacking, noise rejection, amplitude equalization, etc. In step 1606, final or post-processing methods are applied, e.g. migration, wavelet processing, seismic attribute estimation, inversion, etc. and in step 1308 the final image of the subsurface is generated.

An example of a representative processing device capable of carrying out operations in accordance with the embodiments discussed above is illustrated in FIG. 17. Hardware, firmware, software or a combination thereof may be used to perform the various steps and operations described herein.

Figure 17:
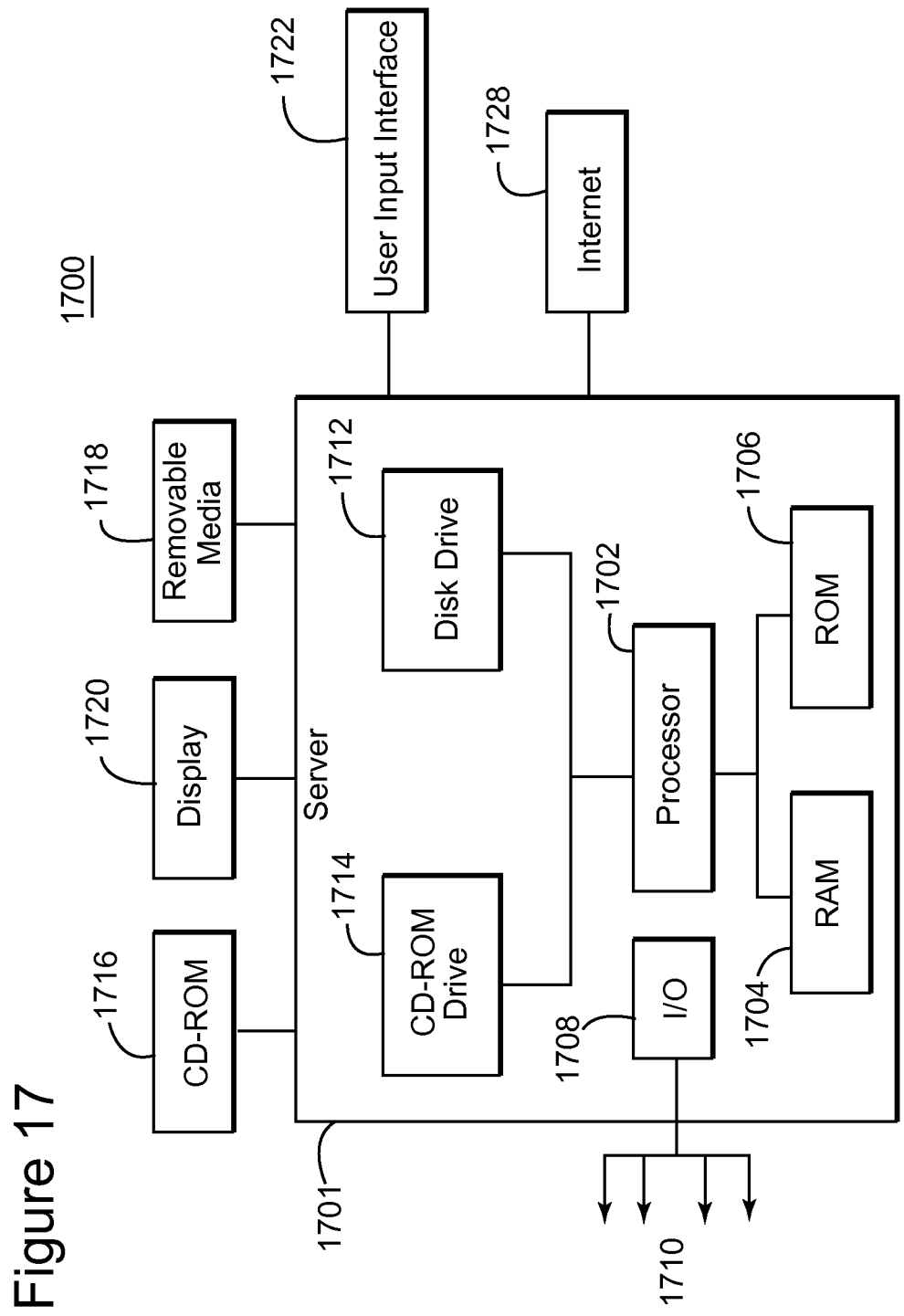
FIG. 17 is a schematic diagram of a control device.

The processing device 1700 of FIG. 17 is an exemplary computing structure that may implement any of the processes and methods discussed above or combinations of them.

The exemplary processing device 1700 suitable for performing the activities described in the exemplary embodiments may include server 1701. Such a server 1701 may include a central processor unit (CPU) 1702 coupled to a random access memory (RAM) 1704 and/or to a read-only memory (ROM) 1706. The ROM 1706 may also be other types of storage media to store programs, such as programmable ROM (PROM), erasable PROM (EPROM), etc. Processor 1702 may communicate with other internal and external components through input/output (I/O) circuitry 1708 and bussing 1710, to provide control signals and the like. For example, processor 1702 may communicate with the air gun, electro-magnetic actuator system and/or the brake mechanism of each source element. Processor 1702 carries out a variety of functions as are known in the art, as dictated by software and/or firmware instructions.

Server 1701 may also include one or more data storage devices, including disk drives 1712, CD-ROM drives 1714, and other hardware capable of reading and/or storing information, such as a DVD, etc. In one embodiment, software for carrying out the above-discussed steps may be stored and distributed on a CD-ROM 1716, removable media 1718 or other form of media capable of storing information. The storage media may be inserted into, and read by, devices such as the CD-ROM drive 1714, disk drive 1712, etc. Server 1701 may be coupled to a display 1720, which may be any type of known display or presentation screen, such as LCD, plasma displays, cathode ray tubes (CRT), etc. A user input interface 1722 is provided, including one or more user interface mechanisms such as a mouse, keyboard, microphone, touch pad, touch screen, voice-recognition system, etc.

Server 1701 may be coupled to other computing devices, such as the equipment of a vessel, via a network. The server may be part of a larger network configuration as in a global area network (GAN) such as the Internet 1728, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

The disclosed exemplary embodiments provide a source array, sub-array and source element capable of boosting an energy generated in the 0.1 to 10 Hz range. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A resonant source element configured to generate seismic waves, the resonant source element comprising:
   a housing;
   a high-pressure system located inside the housing and configured to be discharged inside the housing; and
   a first conduit attached to an opening of the housing and having a proximal open end that directly communicates with an interior of the housing,
   wherein a distal end of the first conduit freely communicates with an ambient.

2. The resonant source element of claim 1, further comprising:
   a flexible member located in the first conduit and configured to separate an interior of housing from seawater.

3. The resonant source element of claim 2, further comprising:
   a valve attached to the housing and configured to allow air from the housing to escape when a water column in the first conduit oscillates and generates low-frequency seismic waves.

4. The resonant source element of claim 1, further comprising:
   a second conduit attached to the housing and having a distal end that freely communicates with the ambient.

5. The resonant source element of claim 4, wherein a shape of the first conduit is different from a shape of the second conduit.

6. The resonant source element of claim 4, wherein a diameter of the first conduit is different from a diameter of the second conduit.

7. The resonant source element of claim 1, wherein the first conduit further comprises:
   a damper configured to damp a motion of a water column inside conduit.

8. A surveying system for exploring a subsurface, the surveying system comprising:
   a high-frequency source array including plural high-frequency source elements; and
   a low-frequency source array including plural low-frequency source elements,
   wherein a low-frequency source element includes,
   a housing,
   a high-pressure system located inside the housing and configured to be discharged inside the housing, and
   a first conduit attached to an opening of the housing and having a proximal open end that directly communicates with an interior of the housing, wherein a distal end of the first conduit freely communicates with an ambient.

9. The seismic survey of claim 8, wherein the low-frequency source element further comprises:
   a flexible member separating a fluid of the ambient from an interior of the housing.

10. The seismic survey of claim 9, wherein the flexible member oscillates and generates low-frequency seismic waves after the high-pressure system is discharged.

11. The seismic survey of claim 8, wherein the low-frequency source element further comprises:
   a second conduit attached to the housing, having a distal end that freely communicates with the ambient.

12. The seismic survey of claim 8, wherein the first conduit further comprises:
   a damper configured to damp a motion of a water column inside the first conduit.

13. The seismic survey of claim 8, wherein the high-frequency source elements are air guns.

14. A resonant source element configured to generate seismic waves, the resonant source element comprising:
   a housing;
   a high-pressure system configured to be discharged inside the housing;
   a first conduit attached to an opening of the housing, wherein a distal end of the first conduit freely communicates with an ambient;
   a flexible member located in the first conduit and configured to separate an interior of the housing from seawater; and
   a valve attached to the housing and configured to allow air from the housing to escape when a water column in the first conduit oscillates and generates low-frequency seismic waves.

15. The resonant source element of claim 14, further comprising:
   a second conduit attached to the housing and having a distal end that freely communicates with the ambient.

16. The resonant source element of claim 15, wherein a shape of the first conduit is different from a shape of the second conduit.

17. The resonant source element of claim 15, wherein a diameter of the first conduit is different from a diameter of the second conduit.

18. The resonant source element of claim 14, wherein the first conduit further comprises:
   a damper configured to damp a motion of a water column inside conduit.

* * * * *